United States Patent
Lien et al.

(10) Patent No.: US 12,079,079 B2
(45) Date of Patent: Sep. 3, 2024

(54) PROXIMITY BASED PARITY DATA MANAGEMENT

(71) Applicant: Micron Technology, Inc., Boise, ID (US)

(72) Inventors: Yu-Chung Lien, San Jose, CA (US); Zhenming Zhou, San Jose, CA (US); Wei Wang, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 17/897,183

(22) Filed: Aug. 28, 2022

(65) Prior Publication Data

US 2024/0070021 A1 Feb. 29, 2024

(51) Int. Cl.
  *G06F 11/10* (2006.01)
  *G06F 11/14* (2006.01)
  *G06F 11/34* (2006.01)

(52) U.S. Cl.
  CPC ...... *G06F 11/1068* (2013.01); *G06F 11/1489* (2013.01); *G06F 11/3409* (2013.01)

(58) Field of Classification Search
  CPC ............. G06F 11/3409; G06F 11/1489; G06F 11/1068
  See application file for complete search history.

(56) References Cited

U.S. PATENT DOCUMENTS

| | | | |
|---|---|---|---|
| 8,095,851 B2 | 1/2012 | Diggs et al. | |
| 8,811,076 B2 | 8/2014 | Venkitachalam et al. | |
| 9,268,657 B1 | 2/2016 | Horn | |
| 10,250,281 B2 | 4/2019 | Achtenberg et al. | |
| 10,789,126 B2* | 9/2020 | Singidi | G06F 3/0688 |
| 11,138,071 B1* | 10/2021 | Agarwal | G06F 3/061 |
| 11,405,140 B2* | 8/2022 | Lee | H04L 5/0055 |
| 2008/0034269 A1* | 2/2008 | Hwang | H03M 13/6356 714/763 |
| 2010/0077280 A1* | 3/2010 | Ootsuka | G11C 7/1006 714/758 |
| 2015/0121169 A1* | 4/2015 | Iliadis | G06F 11/1076 714/766 |
| 2017/0160931 A1* | 6/2017 | Thakkar | G06F 3/0688 |
| 2018/0024897 A1* | 1/2018 | Cai | G06F 11/1666 714/6.12 |
| 2019/0051359 A1* | 2/2019 | Yoo | G11C 16/10 |
| 2019/0354478 A1* | 11/2019 | Kashyap | G06F 11/1072 |
| 2022/0107734 A1* | 4/2022 | Kim | G06F 3/0656 |
| 2022/0179742 A1* | 6/2022 | Yadav | H03M 13/3715 |
| 2023/0054754 A1* | 2/2023 | Oh | G11C 16/10 |
| 2023/0273745 A1* | 8/2023 | Kulkarni | G06F 3/0655 711/154 |

* cited by examiner

*Primary Examiner* — Guy J Lamarre
(74) *Attorney, Agent, or Firm* — Brooks, Cameron & Huebsch, PLLC

(57) ABSTRACT

A method includes generating parity data corresponding to a plurality of word lines coupled to blocks of a memory device and generating additional parity data for a block based on a physical location of the block. The method can further include performing a data recovery operation based on the parity data, the additional parity data, or a combination thereof.

20 Claims, 6 Drawing Sheets

US 12,079,079 B2

PROXIMITY BASED PARITY DATA MANAGEMENT

TECHNICAL FIELD

Embodiments of the disclosure relate generally to memory sub-systems, and more specifically, relate to proximity based parity data management for a memory sub-system

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
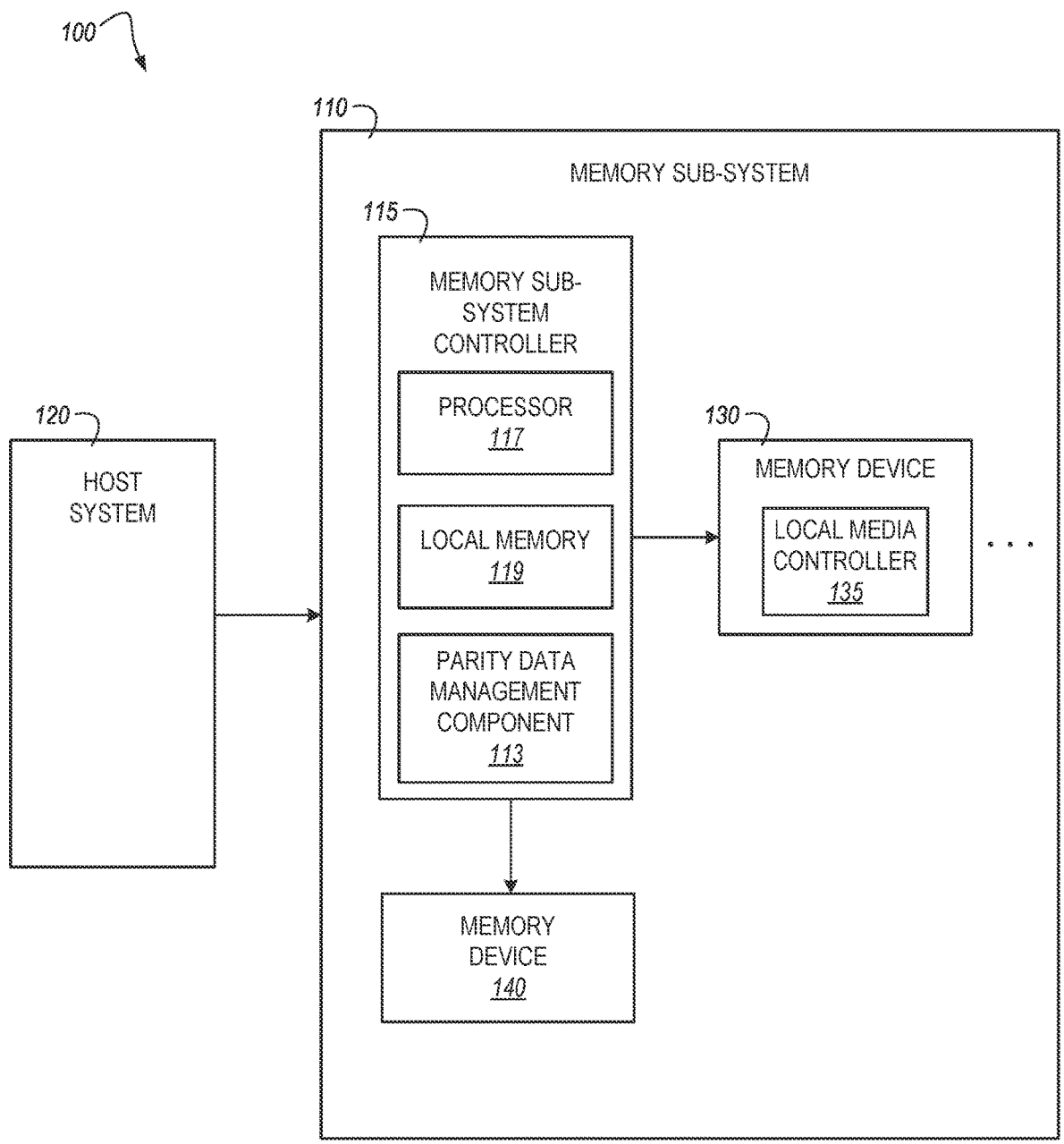
FIG. 1 illustrates an example computing system that includes a memory sub-system in accordance with some embodiments of the present disclosure.

Aspects of the present disclosure are directed to a proximity based parity data management component, in particular to a memory sub-system that includes the proximity based parity data management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

A memory sub-system can employ techniques to perform data recovery in the event of a memory defect associated with the programming of user data (e.g., data written by a host system) to a memory device of the memory sub-system. Conventionally, memory defects can be managed by a controller of the memory sub-system by generating parity data (e.g., exclusive-or (XOR) parity data) based on the written host data. The generated parity data (e.g., the XOR parity data) can be written by a controller to a cache memory (e.g., a volatile memory device such as a random access memory (RAM), dynamic random access memory (DRAM), or synchronous dynamic random access memory (SDRAM)) of the controller.

Currently, redundant array of independent NAND (RAIN) parity protection for a memory sub-system in an SSD can utilize a significant portion of the end-user capacity of the SSD. In other words, the amount of NAND available to the user can be affected by the addition of the RAIN parity protection. The term "RAIN," as used herein, is an umbrella term for computer information (e.g., data) storage schemes that divide and/or replicate (e.g., mirror) information among multiple pages of a memory sub-system, for instance, in order to help protect the data stored in the memory sub-system. A RAIN array may appear to a user and the operating system of a computing device as a single memory device (e.g., disk). RAIN can include striping (e.g., splitting) information so that different portions of the information are stored on different pages of the memory sub-system. The portions of the memory sub-system that store the split data can be collectively referred to as a stripe. As used herein, RAIN can also include mirroring, which can include storing duplicate copies of data on more than one page of more than one memory sub-system.

A RAIN stripe can include (e.g., be a combination of) user data and parity data. The parity data of the RAIN stripe, which can be referred to herein as the parity portion of the RAIN stripe, can include error protection data that can be used to protect user data stored in the memory sub-system against defects and/or errors that may occur during operation of the memory sub-system. For example, the RAIN stripe can protect user data stored in memory sub-system against defects and/or errors that may occur during operation of the memory sub-system and can therefore provide protection against a failure of the memory sub-system.

Some approaches may seek to employ different amounts of parity data for different word lines. For instance, some approaches may designate different word lines as being reliability prone based on testing on the individual word lines at a time of manufacture and/or during an operational lifetime of a memory device.

An example of such testing includes testing to determine a respective read window budget (RWB) of an individual word line. That is, various memory sub-systems, programming cells can involve providing a programming signal to a group of cells (e.g., a page) to place them in target states, which correspond to respective stored data patterns. For example, the cells can be non-volatile flash memory cells configured to store one or more bits of data per cell. As an example, a programming signal used to program the cells can comprise a stepped voltage signal (e.g., voltage ramp) with each step having an associated step size and duration. The programming signal can be applied (e.g., to a word line) as a series of voltage pulses, for instance. The voltage pulses have various characteristics which can affect a read window budget (RWB) associated with the programmed cells.

An RWB can refer to the cumulative value (e.g., in voltage) of a number (e.g., seven) of distances (e.g., in voltage) between adjacent threshold voltage distributions at a particular BER. Such characteristics include pulse magnitude, step size between pulses (e.g., program step size), and pulse duration (e.g., program step duration), among various other characteristics. As used herein, a program step size can be referred to as a voltage difference between successive voltage pulses, and a program step duration can be referred to as a duration for which a voltage pulse is applied. In relation to program step duration, in at least one example, program step duration can be measured by counting clock cycles of a known frequency between a time a program command was issued to a memory (e.g., NAND) and when the memory programming operation is complete. In another example, the program step duration can be measured by using a number of program pulses used to complete the memory program operation and apply a known amount of time for each pulse.

A read window, which may be referred to as a read window width, refers to a distance (e.g., in voltage) between adjacent threshold voltage (Vt) distributions at a particular bit error rate (BER). A read window may also be referred to as a "valley margin" since the Vt distributions include respective peaks with the regions therebetween being referred to as valleys. The RWB can refer to a cumulative value of read windows for a group of programmed cells (e.g., one or more pages of cells). For example, cells configured to store three bits of data per cell may be programmed to one of eight different Vt distributions, each corresponding to a respective data state. In this example, the RWB can be the cumulative value (e.g., in voltage) of the seven read windows between the eight Vt distributions.

The RWB corresponding to a group of memory cells is affected by various factors such as manufacturing differences, temperature, wear cycling (e.g., program/erase cycles), etc. Therefore, the RWB(s) of a system can vary, particularly over time. Variance in the RWB(s) can affect system quality of service (QoS), reliability, and/or performance. For instance, a relatively high RWB may be associated with high reliability (e.g., low bit error rate), whereas a relatively low RWB may be associated with a lower reliability.

As such, some approaches seek to adjust a quantity of parity data associated with word lines based on a given RWB of the word line. For instance, a word line with a lower RWB may be assigned additional parity data (e.g., additional parity bits) as compared to a word line with a higher RWB.

However, as design rules scale such approaches may not account for a higher quantity of components and interactions therebetween. For instance, as a quantity of blocks increases so to may a magnitude and/or quantity of interactions between different blocks. For example, when five or more blocks (e.g., sub-blocks) are associated with a given word line the quantity and/or magnitude of interactions may increase relative to having fewer blocks (e.g., two blocks or four blocks). Moreover, as a quantity of respective tiers including blocks increases vertically, insulating materials may become thinner due to variations in effectiveness of etching processes. The presence of the thinner insulating materials can cause contribute to an increase in a magnitude and/or a quantity of interactions between blocks. Increased magnitude and/or an increased quantity of interactions between blocks can lead to various issues such as read disturb, degraded wear cycling, and/or erase saturation, etc. Such issues can negatively affect system quality of service (QoS), reliability, and/or performance of a memory device.

Aspects of the present disclosure address the above and other deficiencies by generating additional parity data for a block based on a physical location of the block in the memory device. For example, the additional parity data can be generated based on a proximity of a block to an edge of a plane in which the block is included. The block can be designated as an interior block or an exterior block, among other possible proximity-based designations. The additional parity data can be generated based on the respective proximity-based designations, as described herein.

As used herein, an interior block refers to a block that is less proximate to an edge of a plane (in which the block is included) of a given word line than at least one other block in the same plane and same word line. The interior blocks, at least due to their relative distance from the edge of the plane (e.g., being surrounded by at least two other blocks) may be prone to exhibiting an increased quantity and/or increased magnitude of interference with the other blocks. Moreover, an insulating material adjacent the interior block may be thinner than insulating material adjacent an exterior block, as described herein. Conversely, an exterior block refers to a block that is more proximate to an edge of a plane (in which the block is included) of a given word line than at least one other blocks in the same plane and same word line.

Thus, approaches herein can account for a relative proximity of blocks to an edge of plane in which the blocks are included. For instance, approaches herein can yield a reduction space required to store additional parity data as compared to other approaches such as those that initially utilize additional parity data for all blocks and/or employ a uniform performance threshold for generating additional parity data (e.g., that does not account for relative proximity of blocks to an edge of plane). Thus, approaches herein can generate additional parity data for the reliability prone interior blocks sooner than other approaches which employ an individual system threshold for generation of additional parity data, and thus can account for any increased quantity and/or magnitude of interactions impacting the interior blocks. Yet, approaches herein can delay generation of additional parity data for exterior blocks which are less prone to reliability issues, and thus can provide space for storage of user data for a longer period of time than other approaches such as those with employ an individual system threshold for generation of additional parity data, etc.

These and other effects due to the proximate location of blocks and/or sub-blocks in a plane of a memory device can become further exacerbated as the quantity of sub-blocks per plane increases. For example, in current approaches in which four sub-blocks per plane are generally employed, the techniques described herein may provide at least marginal improvements to approaches that do not employ such techniques. However, as the quantity of sub-blocks per plane increase to six sub-blocks per plane and beyond, the effects of the proximity of the blocks and/or sub-blocks to one another and/or to the edge of the plane become more pronounced. In state of the art approaches, these effects can manifest in degraded data retention, reduced data handling, and/or increased error rates, etc. In contrast, embodiments herein provide proximity based parity data management that operates regardless of the quantity of sub-blocks per plane. This, in turn, improves the overall performance of a computing system in which embodiments of the present disclosure operate.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a proximity based data management component 113. Although not shown in FIG. 1 so as to not obfuscate the drawings, the proximity based data management component 113 can include various circuitry to facilitate organization and selective writing of data (e.g., parity data) to particular pages of memory of a memory device 130, 140. For example, the proximity based data management component 113 can generate or cause the generation of parity data for each word line of a block of the memory device 130, 140. Additionally, the proximity based data management component 113 can generate or cause the generation of parity data (e.g., the additional parity data 439-1, 439-2 described in connection with FIG. 4B, herein) for a block of the memory device 130, 140 based on the proximity of the block to an edge of the die, as detailed herein. In some embodiments, the proximity based data management component 113 can include special purpose circuitry in the form of an ASIC, FPGA, state machine, and/or other logic circuitry that can allow the proximity based data management component 113 to orchestrate and/or perform operations associated with proximity based parity data management for the memory device 130 and/or the memory device 140 as described herein.

In some embodiments, the memory sub-system controller 115 includes at least a portion of the proximity based data management component 113. For example, the memory sub-system controller 115 can include a processor 117 (processing device) configured to execute instructions stored in local memory 119 for performing the operations described herein. In some embodiments, the proximity based data management component 113 is part of the host system 110, an application, or an operating system.

In a non-limiting example, an apparatus (e.g., the computing system 100) can include a proximity based data management component 113. The proximity based data management component 113 can be resident on the memory sub-system 110. As used herein, the term "resident on" refers to something that is physically located on a particular component. For example, the proximity based data management component 113 being "resident on" the memory sub-system 110 refers to a condition in which the hardware circuitry that comprises the proximity based data management component 113 is physically located on the memory sub-system 110. The term "resident on" may be used interchangeably with other terms such as "deployed on" or "located on," herein.

Figure 2:
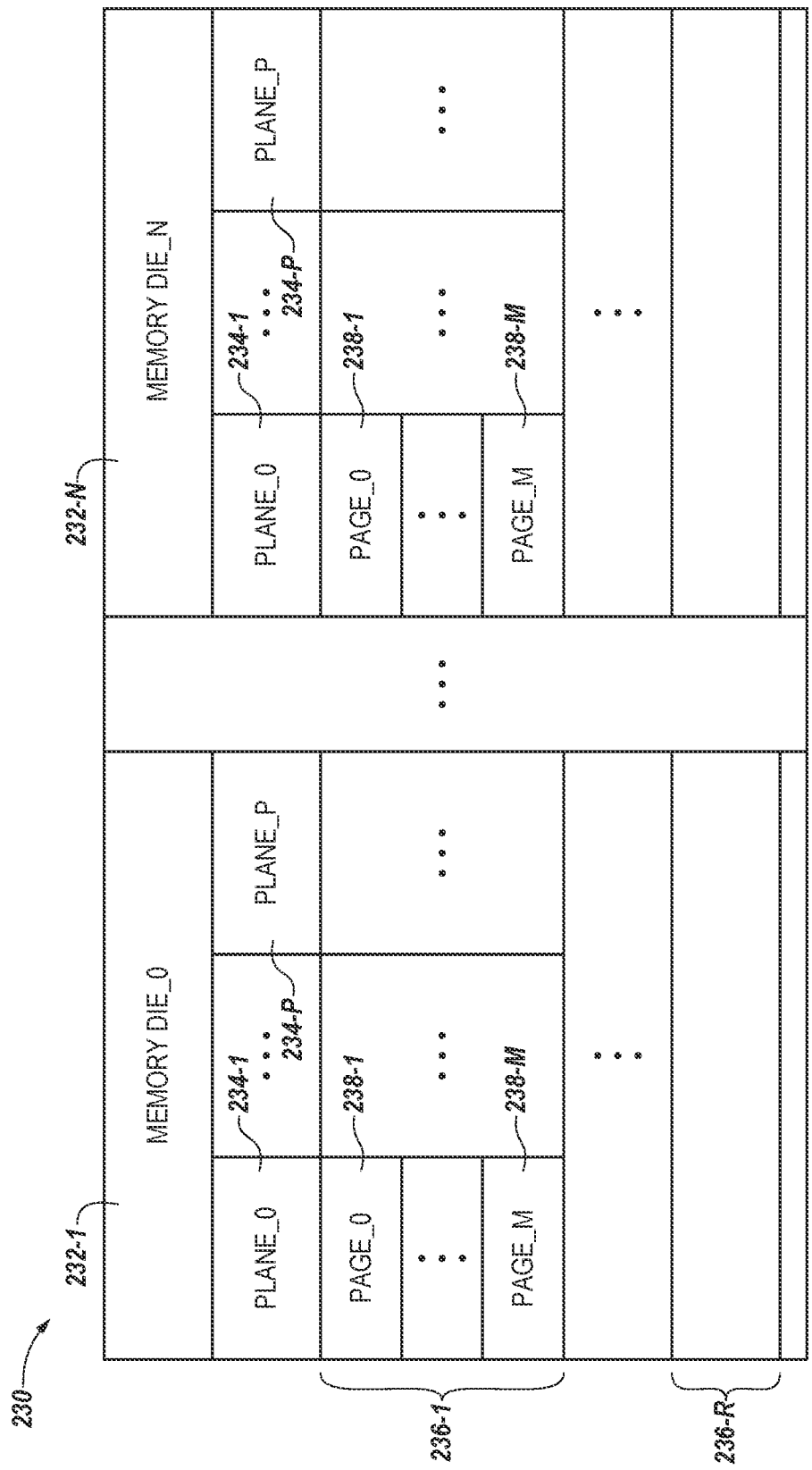
FIG. 2 illustrates an example memory device in accordance with some embodiments of the present disclosure.

FIG. 2 illustrates an example memory device 230 in accordance with some embodiments of the present disclosure. The memory device 230 can be analogous to the memory device 130 illustrated in FIG. 1, herein. Although not shown so as not obfuscate the drawings, the memory device 230 can be a non-volatile memory device 230 that includes an array of non-volatile memory cells. In some embodiments, the memory device 230 can be a NAND flash memory device (e.g., a 3-D NAND flash memory device) and/or can be deployed in a mobile computing device such as a mobile phone, laptop, IoT device, or the like.

As shown in FIG. 2, the memory device 230 can include multiple memory dice 232-1 to 232-N (e.g., the MEMORY_DIE_0 to the MEMORY_DIE_N), which can each include multiple planes 234-1 to 234-P (e.g., the PLANE_0 to the PLANE_P). A number of pages, which can be referred to as blocks (or sub-blocks) 238-1 to 238-M can be included in each of the planes 234-1 to 234-P. That is, as shown in FIG. 2, a number of pages or physical blocks (or sub-blocks) 238-1 to 238-P can be included in a plane 234-1 to 234-P, and a number of planes 234-1 to 234-P can be included on a memory die 232-1 to 232-N.

As shown in FIG. 2, the blocks 238-1 to 238-M can be included in one or more physical rows 236-1 to 236-R. The rows 236-1 to 236-R can be coupled to word lines (e.g., access lines) and can, as is appropriate given the context, be referred to as word lines 236-1 to 236-R, herein. Further, although not shown in FIG. 2, the memory cells can be coupled to sense lines (e.g., data lines and/or digit lines).

As one of ordinary skill in the art will appreciate, each row 236-1 to 236-R can include a number of blocks of memory cells (e.g., groups of physical pages). A block of memory cells refers to a unit of programming and/or sensing (e.g., a number of memory cells that are programmed and/or sensed together as a functional group and are generally characterized as being erased on a block-by-block basis). In some embodiments, each row 236-1 to 236-R comprises one block of memory cells. However, embodiments of the present disclosure are not so limited. For instance, in some embodiments, each row 236-1 to 236-R can include multiple blocks 238-1 to 238-M of memory cells (e.g., one or more even blocks of memory cells coupled to even-numbered word lines and/or bit lines, and one or more odd blocks of memory cells coupled to odd numbered word lines and/or bit lines). Additionally, for embodiments including multilevel cells, a block 238-1 to 238-M of memory cells can store multiple logical pages of data (e.g., an upper page of data, a lower page of data, and/or an extra page of data, with each cell in a block storing one or more bits towards an upper page of data, one or more bits towards a lower page of data, and/or one or bits towards the extra page of data).

Although not explicitly shown in FIG. 2, a row 236-1 to 236-R of memory cells can comprise a number of physical sectors (e.g., subsets of memory cells). Each physical sector of cells can store a number of logical sectors of data. Additionally, each logical sector of data can correspond to a portion of a particular block of data. As an example, one logical sector of data stored in a particular physical sector can correspond to a logical sector corresponding to one block (e.g., block 238-1) of data, and the other logical sector of data stored in the particular physical sector can correspond to other blocks (e.g., block 238-M) of data. Each physical sector can store system data, user data, and/or overhead data, such as error correction code (ECC) data, LBA data, and/or metadata.

Figure 3:
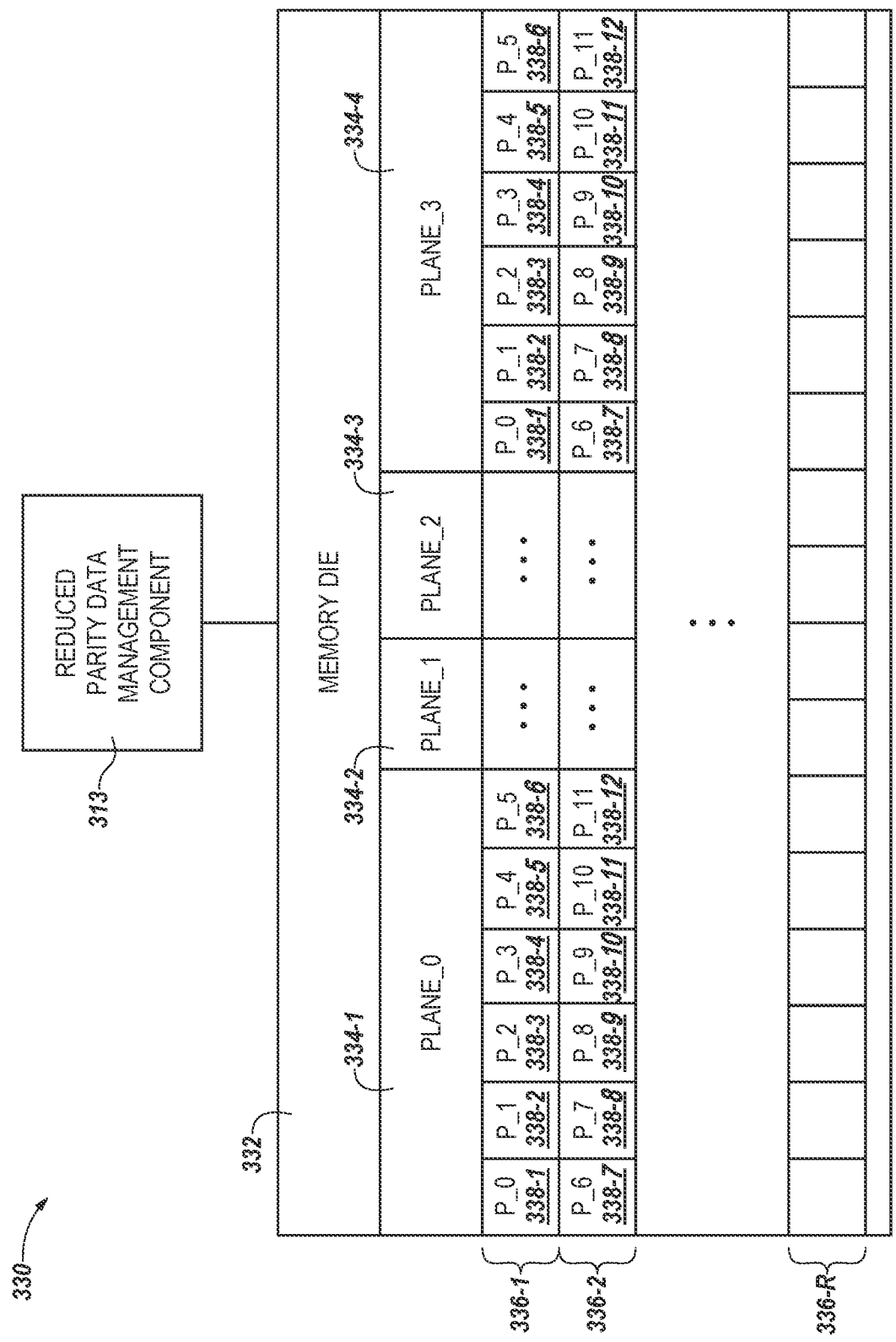
FIG. 3 illustrates an example memory device and a proximity based data management component in accordance with some embodiments of the present disclosure.

FIG. 3 illustrates an example memory device 330 and proximity based data management component 313 in accordance with some embodiments of the present disclosure. The proximity based data management component 313 can be analogous to the proximity based data management component 113 illustrated in FIG. 1 and the memory device 330 can be analogous to the memory device 130 illustrated in FIG. 1 and/or the memory device 230 illustrated in FIG. 2. In some embodiments, the memory device 330 and/or the proximity based data management component 313 can be deployed in a mobile computing device, such as a smartphone, laptop computer, IoT device, or the like.

As shown in FIG. 3, the memory device 330 includes a memory die 332, which can be analogous to one of the memory dice 232-1 to 232-N illustrated in FIG. 2. The memory die 332 can include multiple memory planes (PLANE_0 334-1, PLANE_1 334-2, PLANE_3 334-3, PLANE_4 334-4, etc.), which can be analogous to the memory planes 234-1 to 234-N illustrated in FIG. 2.

Each of the planes 334-1 to 334-4 can include one or more blocks (or sub-blocks) (e.g., the blocks 238-1 to 238-M illustrated in FIG. 2, herein) that can include a block of data. The blocks of data can include parity data (e.g., RAIN parity data) that can be used in a data recovery operation such as a RAIN recovery operation. For instance, as detailed herein with respect to FIG. 4A and FIG. 4B each of the blocks can include parity data and a subset of the blocks can include additional parity data. The additional parity data refers to the presence of one or more additional parity bits than a quantity of parity bits in other blocks (those without additional parity data).

Blocks of the memory device (e.g., the blocks 238-1 to 238-M illustrated in FIG. 2, herein) can include data and be referred to as blocks of data 338-1 to 338-12. The blocks of data 338-1 to 338-12 can be included in one or more physical rows 336-1 to 336-R, which can be analogous to the physical rows 236-1 to 236-R illustrated in FIG. 2, herein. As described above, the rows 336-1 to 336-R can be coupled to word lines (e.g., access lines) and can, as is appropriate given the context, be referred to as word lines 336-1 to 336-R, herein. The blocks of data 338-1 to 338-12 can include data in individual pages such as an upper page, a lower page, and/or an extra page depending on a type of memory cell architecture employed by the memory device 300.

The proximity based data management component 313 can generate parity data corresponding to a plurality of word lines 336-1 to 336-R coupled to the blocks 338-1 to 338-12. For instance, parity data can be generated for each word line 336-1 to 336-R.

The blocks 338-1 to 338-12 can include a quantity of at least five blocks, at least six blocks, or at least eight blocks per plane, etc. (e.g., in a given plane for a given word line). For example, as is illustrated in FIG. 3 there can be quantity of six blocks 338-1 to 338-6 or 338-7 to 338-12 per plane (for a given word line). However, the disclosure is not so limited. For instance, in other embodiments there can be quantity of five blocks per plane, seven blocks per plane, or eight blocks per plane, among other possibilities.

The proximity based data management component 313 can designate some or all blocks with a given proximity designation. The proximity based data management component 313 can be configured to designate an innermost block relative to an edge of a plane in which the blocks are included as the interior blocks. For instance, in embodiments with a quantity of five blocks, an individual innermost block or the three innermost blocks can be designated as interior blocks. The other blocks can be designated as exterior blocks or can remain undesignated.

In some embodiments, an individual block innermost block such as 338-3 or 338-4 can be designated as an interior block. However, in some embodiments, the proximity based data management component 313 can be configured to designate two innermost blocks relative to an edge of a plane in which the blocks are included as the interior blocks. The blocks can be physical blocks. For instance, continuing with the embodiments illustrated in FIG. 3, physical blocks (338-3 and 338-4) can be designated as interior blocks. Physical blocks 338-3 and 338-4 are less proximate to an edge of the plane 334-1 than the other physical blocks 338-1, 338-2, 338-5, and 338-6 in the same plane 334-1 on the same word line 336-1. That is, in some embodiments, at least two of the quantity of six blocks (physical blocks) can be designated the interior blocks. The other blocks (e.g., 338-1, 338-2, 338-5, and 338-6) can be designated as exterior blocks or can remain undesignated.

In some embodiments, the quantity of the blocks can be equal to eight blocks per plane. In such embodiments, the proximity based data management component 313 can designate at least two of the eight blocks as interior blocks. For instance, the two innermost or the four innermost blocks of the quantity of eight blocks can be designated as interior blocks, among other possibilities.

In a non-limiting example, the proximity based data management component 313 can receive host data to be written to the memory device 330, which can be deployed within a memory sub-system such as the memory sub-system 110 illustrated in FIG. 1. For example, the proximity based data management component 313 of the memory sub-system can receive host data to be written to one or more blocks, sub-blocks, or pages of the memory device associated with a memory sub-system, where each block, sub-block, and/or page is coupled to one of multiple word lines of the memory device as discussed herein. The proximity based data management component 313 can generate parity data for each word line (e.g., 336-1 to 336-R) of the memory device 330 for use in a data recovery operation of the memory device 330 (e.g., for each block of the memory device).

The proximity based data management component 313 can designate the blocks with a respective proximity designation based on proximity of the respective block to an edge of a plane. For example, the proximity based data management component 313 can divide blocks in each plane into different subsets of different respective proximity designation such as an interior or exterior designation, etc. Dividing the blocks based on proximity can use a predetermined indexing protocol. The predetermined indexing protocol can identify and assign a relative position for each block in a given plane.

Identifying and assigning the relative position for each block can include, for example, sequentially numbering and assigning the blocks of a given plane with a positive integer (e.g., 0, 1, 2, 3, 4, 5, etc.). Once numbered and assigned, each block can be designated with a given proximity designation. The proximity designation can be located in a look-up table or otherwise stored. For instance, a "0" can indicate that a given block is an exterior block and a "1" can indicate that a block is an interior block, among other possibilities. Other schemes are also possible.

The proximity based data management component 313 can generate the additional parity data for blocks having a given proximity designation such as a given proximity of a block to an edge of a plane in which the block is included. For instance, additional parity data can be generated for interior blocks. Generation of the additional parity data can include generation of at least one additional bit (in addition to an amount of bits of parity data already present). Thus, a subset of the blocks such as the interior blocks can have additional parity data.

However, in some embodiments a tiered approach to an amount of additional parity data associated with a block can be employed. For example, innermost blocks can have first (highest) amount of additional parity data associated therewith, intermediate blocks located between interior blocks and exterior blocks can have a second (middle) amount of additional parity data associated therewith, and exterior blocks can have a third (lowest or absence thereof) additional parity data associated therewith. For instance, in the embodiments described in FIG. 3 an amount of additional parity for blocks having different proximity designations can be represented as indicated below, among other possibilities.

Additional parity [SB1 (e.g., 338-1), SB6 (e.g., 338-6)] <additional parity [SB2 (338-2), SB5 (338-5)]<additional parity SB3 [(338-3), SB4 (338-4)]. That is, a first additional parity group formed of blocks designated as interior blocks (e.g., 338-3, 338-4) can have the highest quantity of additional parity bits associated therewith, the second additional parity group (e.g., 338-2, 338-5) can have an intermediate quantity of additional parity bits (that is less than first group but greater than the third parity group), and the third additional parity group can have less additional parity bits than the second additional parity group. As such, embodiments here can provide a tiered approach to accounting for a proximity of a given block to an edge of plane in which the blocks is located in.

The proximity based data management component 313 can store the parity data and, when present, the additional parity data. For instance, the parity data can be stored in each block and/or otherwise stored. In some embodiments, the additional parity data can be stored in blocks which satisfy a performance threshold. For instance, the additional parity data can be stored in interior blocks which satisfy a performance threshold, as described herein.

For the various embodiments, the additional parity data set can be generated and subsequently written in the memory sub-system in response to a successful program operation invoking a past page. In some embodiments, the additional parity data set is assigned and written to its own memory stripe (e.g., word line 336-1) that invokes at least one memory die 332 of the memory device 330. Continuing with the above example, the additional parity data set can be part of a redundant array of independent NAND (RAIN) recovery data set written to the memory device 330. Accordingly, the additional parity data set can contain data corresponding to a parity portion of RAIN recovery data written to the memory device 330.

In some embodiments, the proximity based data management component 313 can cause performance of the data recovery operation using parity data, the additional parity data, or both. The proximity based data management component 313 can cause performance of the data recovery operation responsive to a determination that that a failure involving host data written to the memory device 330 has occurred. The data recovery operation can be, for example, a RAIN recovery operation to recover host data having uncorrectable errors associated therewith. At least one uncorrectable error associated with a program status fail can be recovered using the parity data and/or the additional parity data as provided herein. For example, the processing device can further perform operations including causing performance of a data recovery operation responsive to a determination that that a failure involving host data written to the subsets of memory blocks has occurred. In this way, at least one uncorrectable error associated with a program status fail can be recovered using the parity data, the additional parity data, or both.

For the various embodiments, the data recovery operation can be performed during idle time of the memory device. As used herein, an idle time of the memory device includes time during which host operations are not being performed with respect to the memory device and therefore during a time in which an interface coupling the host to the memory sub-system is not encumbered. However, in some embodiments, the data recover operation can be performed while the interface is active or encumbered with host traffic.

Figure 4A:
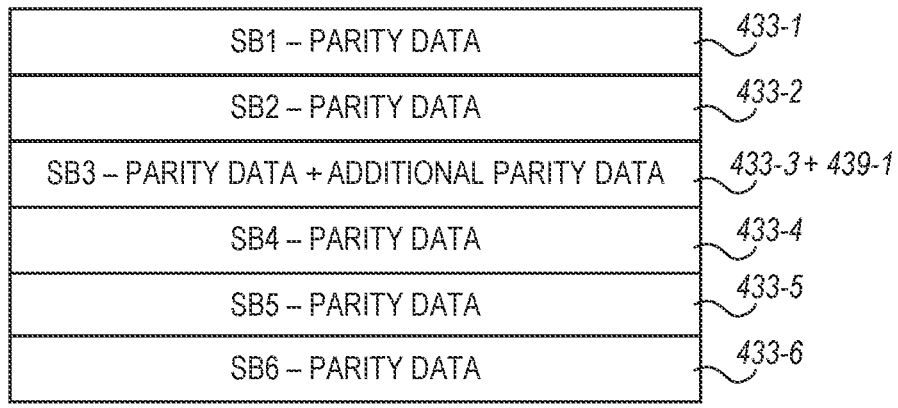
FIG. 4A illustrates an example of a parity data scheme for proximity based parity data management in accordance with some embodiments of the present disclosure.

FIG. 4A illustrates an example of a parity data scheme for proximity based parity data management in accordance with some embodiments of the present disclosure. Word lines and/or blocks in a plane can have parity data (illustrated in FIG. 4A as "PARITY DATA") associated therewith. the parity data for each word line can be a subset of data contained in the word line. For example, the parity data from a given word line can include parity data from each block or page of memory cells contained within the word line. The parity data can be generated for each block in a given plane in a given word line, in some embodiments. For example, SB1, SB2, SB3, SB4, SB5, and SB 6 corresponding to blocks or sub-blocks 338-1, 338-2, 338-3, 338-4, 338-5, and 338-6, respectively, in FIG. 3 can have parity data associated therewith (e.g., stored therein).

As mentioned, additional parity data can be generated. For instance, in the example of described in FIG. 3, there can be 6 blocks or sub-blocks (SB) in a given plane in a given word line. In such embodiments, at least one of the innermost blocks can be designated as an interior block. For instance, block 338-3 (e.g., SB3) can be designated as an interior block. In such embodiments, additional parity data can be generated for the interior block. For instance, as illustrated in FIG. 4A, additional parity data 439-1 can be generated for and stored in SB3, among other possibilities. In this way, each block can include respective parity data 433-1, 433-2, 433-3, 433-4, 433-5, and 433-6 and at least one block designated as an interior block can include the additional parity data such as additional parity data 439-1.

Figure 4B:
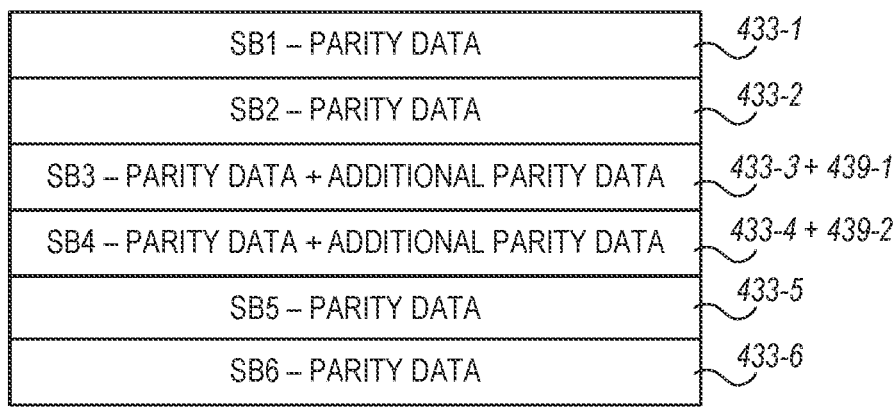
FIG. 4B illustrates another example of a parity data scheme for proximity based parity data management in accordance with some embodiments of the present disclosure.

Similarly, FIG. 4B illustrates another example of a parity data scheme for proximity based parity data management in accordance with some embodiments of the present disclosure. FIG. 4B is analogous to FIG. 4A, but includes additional parity data 439-1, 439-2 for the two innermost blocks. As illustrated in FIG. 4B, the additional parity data 439-1, 439-2 can be stored in the interior blocks. Storing the additional parity data in an interior block can facilitate aspects herein such as performing a data recover operation associated with the interior block. For instance, the parity data 433-3 and the additional parity data 439-1 can be utilized to perform a data recover operation associated with block 338-3 illustrated in FIG. 3. However, other storage locations are possible.

Figure 4C:
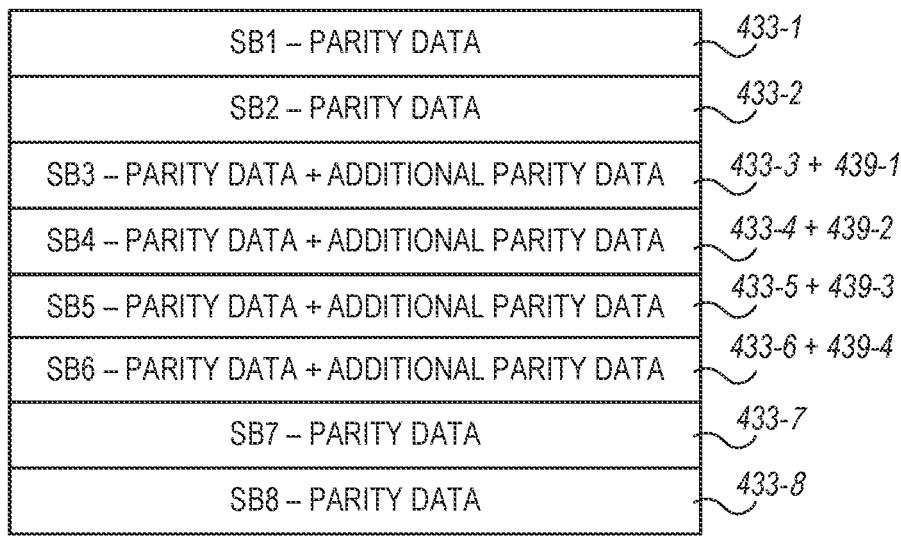
FIG. 4C illustrates yet another example of a parity data scheme for proximity based parity data management in accordance with some embodiments of the present disclosure.

FIG. 4C illustrates yet another example of a parity data scheme for proximity based parity data management in accordance with some embodiments of the present disclosure. FIG. 4C is similar to FIG. 4A and FIG. 4B, but includes eight blocks per plane (e.g., per word line), instead of six blocks.

As illustrated in FIG. 4C, additional parity data 439-1, 439-2, 439-3, and 439-4 can be generated for and can be stored in interior blocks such as the interior blocks SB3, SB4, SB5, and SB 6. Thus, the interior blocks can each have parity data and additional parity data associated therewith. For instance, SB3 can have parity data 433-3 and additional parity data 439-1 stored therein, as illustrated in FIG. 4C. SB4 can have parity data 433-4 and additional parity data 439-2 stored therein. SB5 can have parity data 433-5 and additional parity data 439-3 stored therein. SB6 can have parity data 433-6 and additional parity data 439-4 stored therein. The other blocks SB1, SB2, SB7, and SB8 can be designated as exterior blocks. As such, the exterior blocks SB1, SB2, SB7, and SB8 can have parity data 433-1, 433-2, 433-7, and 433-8 associated therewith, respectively. Thus, the exterior blocks may not have additional parity data associated therewith as illustrated in FIG. 4C or may have additional party data that is subsequently (e.g., based on performance threshold) later associated therewith. While the parity data and additional parity data are stored in respective blocks in FIG. 4C, other storage locations for the parity data and/or the additional parity data are possible.

While FIG. 4C illustrates a total of four interior blocks (the four innermost blocks in a plane) and four exterior blocks, the quantity of blocks designated as interior blocks and/or exterior blocks can be varied. For instance, the two innermost blocks (e.g., SB4, SB5) in a plane or the six innermost blocks (SB2, SB3, SB4, SB5, SB6) in a plane can be designated as interior blocks, among other possibilities.

Figure 5:
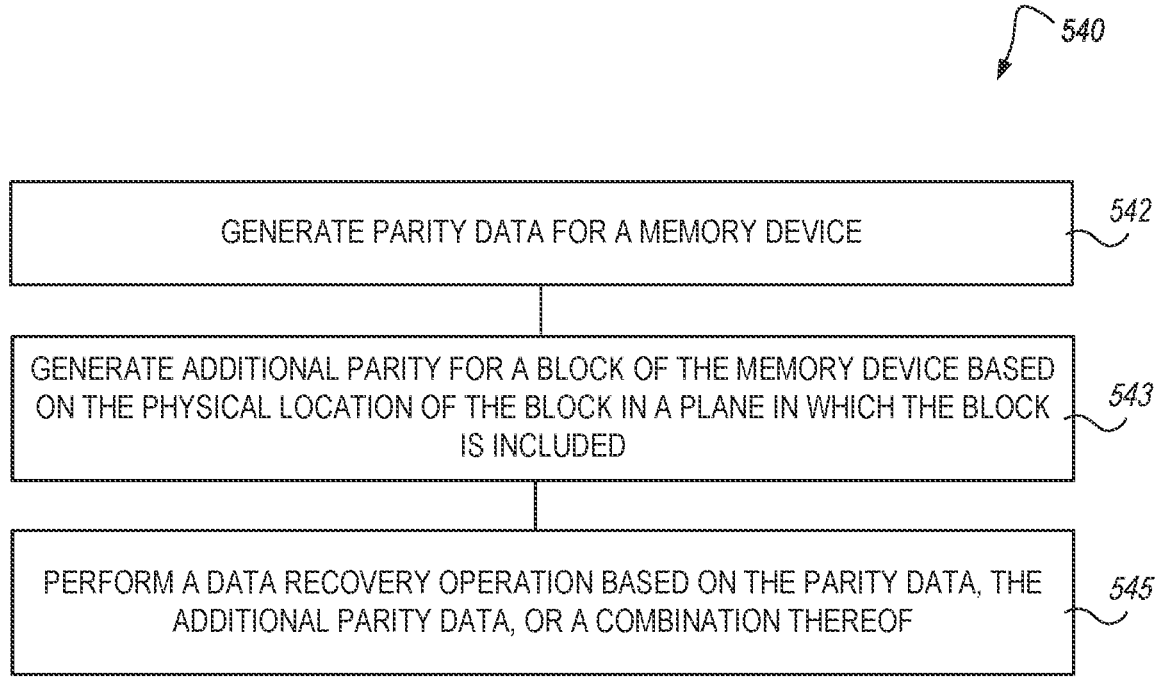
FIG. 5 is a flow diagram corresponding to a method for proximity based parity data management in accordance with some embodiments of the present disclosure.

FIG. 5 is a flow diagram corresponding to a method for proximity based parity data management in accordance with some embodiments of the present disclosure. The method 540 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 540 is performed by the proximity based data management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Host data to be written to one or more blocks (e.g., the block 238-1 to 238-M illustrated in FIG. 2, herein) of the memory device (e.g., the memory device 330 illustrated in FIG. 3, herein) associated with a memory sub-system is received. In some embodiments, each block of the memory device is coupled to one of a number of word lines of the memory device.

At 542, parity data corresponding to recovery of the uncorrectable error for each word line of the memory device is generated. For instance, the parity data can be generated as part of or responsive to a host write operation. As discussed herein, the proximity based data management component 113 can generate parity data (e.g., the data 433-1 to 433-6 described in connection with FIGS. 4A and 4B, herein) for each word line of a block of the memory device 130, 140.

At 543, additional parity data corresponding to recovery of the uncorrectable error for a block is generated. The additional parity data can be generated based on a physical location of the block in a plane of the memory device and/or can be generated based on a block having a performance characteristic that exceeds a performance threshold, as detailed herein.

In some embodiments, a performance threshold can be associated with a block having a given designation such as a designation as an interior block or an exterior block. For instance, an interior block can be associated with a first performance threshold and an exterior block can be associated with a second performance threshold. In some embodiments, each interior block can be associated with a first performance threshold and each exterior block can be associated with a second performance threshold. While described above with regard to a first performance threshold and a second performance threshold, additional performance thresholds (e.g., a third performance threshold associated with an intermediate block) may be employed.

The first performance threshold can be less than the second performance threshold. Stated differently, the second performance threshold can be greater than the first performance threshold 456. For instance, the first performance threshold can be a first RWB value, and the second performance threshold can be a second RWB value that is greater than the first RWB value. For example, a first RWB threshold can be associated with a subset of the blocks designated as interior blocks and a second RWB threshold (e.g., which is higher than the first RWB threshold) can be associated with a subset of the blocks designated as exterior blocks.

In some embodiments, the first performance threshold can be less than a system default performance threshold and the second performance threshold can be greater than the system default performance threshold. As used herein, as system default performance threshold refers to an individual performance threshold that may employed for in various other approaches which do not account for block proximity.

Having the first performance threshold be less than the second performance threshold and/or the system default performance threshold can promote aspects herein. For instance, additional parity data can be generated sooner for the reliability prone interior blocks (that have a first performance threshold that is less than a second performance threshold and/or a system default performance threshold, etc.) sooner than other approaches, and thus can account for any increased quantity and/or magnitude of interactions impacting the interior blocks, etc. For instance, additional parity data can be generated for at least one block included in the first subset (corresponding to the interior blocks) responsive to having a performance metric of the at least one block that satisfies the first performance threshold at a first time.

Yet, approaches herein can delay generation of additional parity data for exterior blocks (that have a second performance threshold that is higher than the first performance threshold and/or a system default performance threshold, etc.) which are less prone to reliability issues and thus can provide more space for storage of user data for a longer period of time than other approaches such as those with employ an individual system threshold for generation of additional parity data, etc. For instance, additional parity data can be generated for at least one block included in the second subset (e.g., corresponding to exterior blocks) responsive to having a performance metric of the at least one block that satisfies the second performance threshold at a second time that is after the first time.

In some embodiments, a respective performance metric can be determined for respective block. For instance, a respective RWB value can be determined for a given block. The RWB can refer to a given value, range of values, and/or an amount of deviation for a target RWB of the block.

In some embodiments, the performance metric (e.g., a RWB and/or a given reliability characteristic) can be compared to a performance threshold. An example of a performance metric includes a threshold RWB and/or threshold deviation from a target RWB and/or threshold RWB. Use of an additional and/or an alternate performance metric such as various thresholds associated with reliability characteristics (e.g., a threshold PEC count) are possible.

Responsive to a determination that the performance metric satisfies (e.g., is equal to or exceeds) the performance threshold, additional parity data can be generated. For instance, a performance metric of an interior block can be compared to a first performance metric and additional parity data can be generated for the interior block responsive to a determination that the performance metric satisfies the performance threshold. Conversely, responsive to a determination that the performance metric does not satisfy (e.g., is less than) the first performance threshold additional parity data is not generated. Stated differently, a processing resource can abstain from generating additional parity data for the exterior block when the performance metric does not satisfy a performance threshold. Similarly, a performance metric of an exterior block can be compared to a second performance threshold and responsive to a determination that the performance metric satisfies (e.g., is equal to or exceeds) the second performance threshold additional parity data can be generated for the exterior block. Conversely, a processing resource can abstain from generating additional parity data for the exterior block when the performance metric does not satisfy a performance threshold such as the second performance threshold.

The parity data and the additional parity data can be stored. For instance, the parity data and the additional parity data can be stored in the memory sub-system (e.g., in the local memory 119, in memory device 130, and/or in memory device 140). For example, the parity data and/or the additional parity data can be written as redundant array of independent NAND (RAIN) data as part of writing the data corresponding to recovery of the uncorrectable error. In some examples, the parity data and the additional parity data can be stored in a block, as detailed herein.

At 545, a data recovery operation, as described herein, can be performed based on (using) the parity data, the additional parity data, or a combination thereof. The data recovery operation can be performed by a processing device, such as the proximity based data management component 113 illustrated in FIG. 1, herein. In some embodiments, the data recovery operation can be performed in response to a determination that a failure involving host data written to the memory device has occurred.

Figure 6:
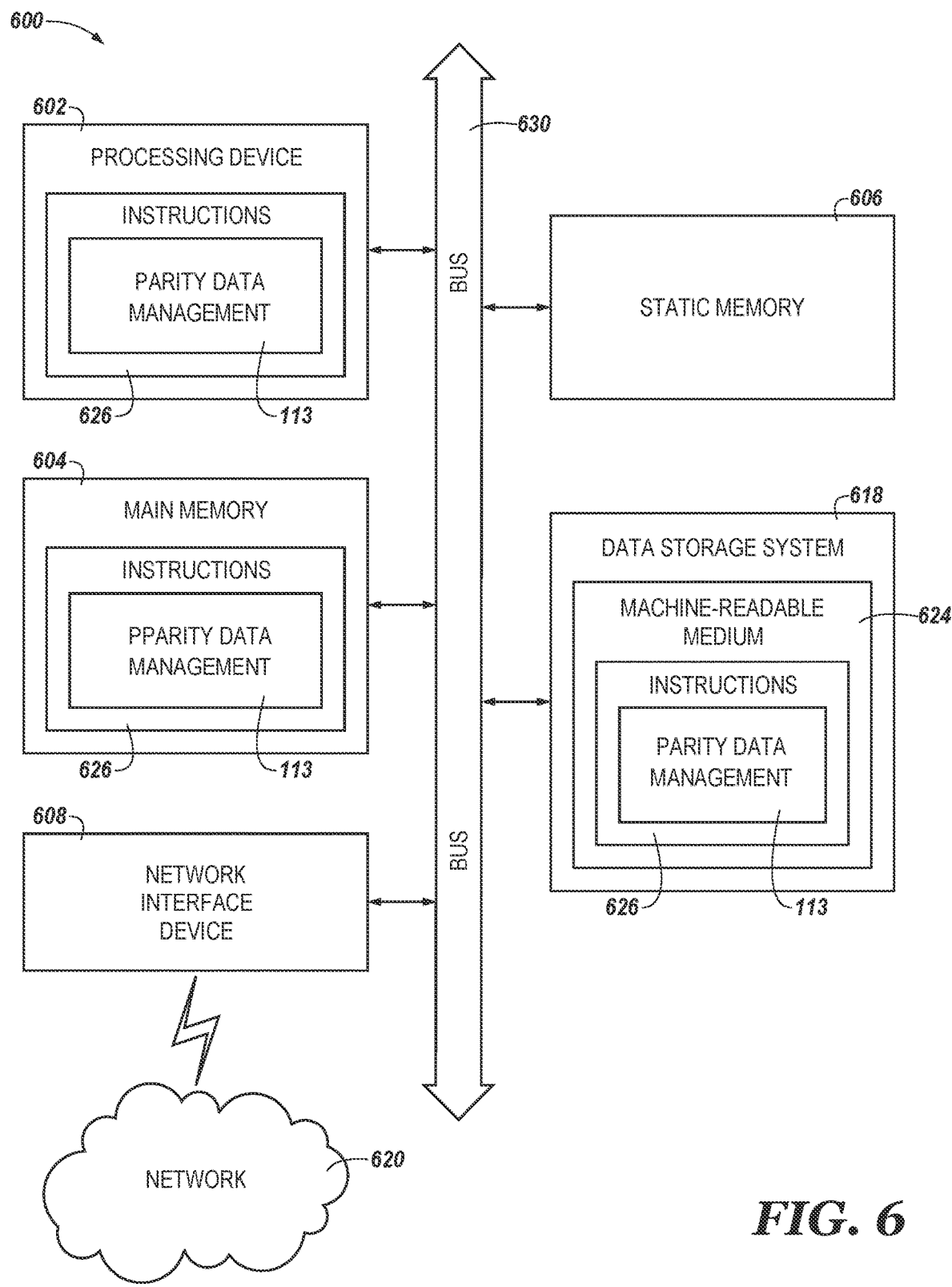
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the proximity based data management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a proximity based parity data management component (e.g., the proximity based data management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    determining whether a block of a memory device is an interior block within a memory structure comprised of a plurality of adjacent blocks;
    generating parity data, corresponding to a plurality of word lines, coupled to each of the plurality of adjacent blocks of the memory device;
    determining that a particular interior block needs additional parity data;
    generating additional parity data for the particular interior block determined to need additional parity data; and
    performing a data recovery operation based on the parity data, the additional parity data, or a combination thereof.

2. The method of claim 1, further comprising generating the additional parity data based on a proximity of the block to an edge of the plane.

3. The method of claim 2, further comprising generating the additional parity data based on the proximity of the block to the edge of the plane by:
    designating the block as an interior block;
    associating a first performance threshold with the interior block;
    determining that a performance metric of the interior block satisfies the first performance threshold; and
    responsive to determining the performance metric satisfies the first performance threshold, generating the additional parity data for the interior block.

4. The method of claim 3, further comprising storing the additional parity data in the interior block.

5. The method of claim 2, further comprising:
    designating a block as an exterior block;
    associating a second performance threshold with the exterior block;
    determining that a performance metric of the exterior block does not satisfy the second performance threshold; and
    responsive to determining the performance metric does not satisfy the performance threshold, abstaining from generating additional parity data for the exterior block.

6. The method of claim 1, further comprising generating the additional parity data based on a performance metric associated with a block during an operational lifetime of the memory device.

7. The method of claim 6, wherein the performance metric further comprises a read window budget (RWB), and wherein the method further comprises:
    determining a respective RWB value of the block;
    comparing the respective RWB value to a RWB threshold associated with the block;
    determining the respective RWB value satisfies the RWB threshold; and
    responsive to the determination that the respective RWB satisfies the RWB threshold, generating the additional parity data for the block.

8. The method of claim 7, wherein the RWB threshold further comprises:
    a first RWB threshold associated with a subset of the plurality of blocks designated as interior blocks; and
    a second RWB threshold associated with a subset of the plurality of blocks designated as exterior blocks.

9. An apparatus, comprising:
    a processing device configured to:
        determine whether a block of a memory device is an interior block within a memory structure comprised of a plurality of adjacent blocks;
        generate parity data for each word line of the plurality of adjacent blocks of a memory device, wherein each block is coupled to one of a plurality of word lines;
        associate a first performance threshold with a first subset of the blocks designated as interior blocks;
        associated a second performance threshold with a second subset of the blocks designated as exterior blocks;
        determine that a particular interior block needs additional parity data wherein the determination is responsive to a performance metric of the particular interior block satisfying the first performance threshold; and
        perform a data recovery operation based on the parity data, the additional parity data, or a combination thereof.

10. The apparatus of claim 9, wherein the first performance threshold is less than the second performance threshold.

11. The apparatus of claim 9, wherein the first performance threshold comprises a first read window budget (RWB) value, and wherein the second performance threshold comprises a second RWB value.

12. The apparatus of claim 9, wherein the first performance threshold is less than a system default performance threshold.

13. The apparatus of claim 9, wherein the second performance threshold is greater than a system default performance threshold.

14. The apparatus of claim 9, wherein the processing device is further configured to:
    generate additional parity data for at least one block included in the first subset responsive to the performance metric of the at least one block in the first subset satisfying the first performance threshold at a first time; and
    generate additional parity data for at least one block included in the second subset responsive to a performance metric of the at least one block in the second subset satisfying the second performance threshold at a second time that is after the first time.

15. A system, comprising:
    a plurality of blocks each coupled to one of a plurality of word lines in a memory device, wherein a quantity of the plurality of blocks is equal to or greater than five blocks per plane in the memory device; and a processing device coupled to the plurality of blocks, wherein the processing device is configured to:

determine whether a block of the memory device is an interior block within a memory structure comprised of a plurality of adjacent blocks;

generate parity data for each word line of the plurality of adjacent blocks of a memory device;

associate a first performance threshold with a first subset of the blocks designated as interior blocks;

associated a second performance threshold with a second subset of the plurality of the blocks designated as exterior blocks;

determine that a particular interior block needs additional parity data wherein the determination is responsive to a performance metric of the particular interior block satisfying the first performance threshold; and perform a data recovery operation based on the parity data, the additional parity data, or a combination thereof.

16. The system of claim 15, wherein the quantity of the plurality of blocks is equal to six blocks per plane in the memory device.

17. The system of claim 16, wherein the processing device is configured to designate at least one of the six blocks as an interior block.

18. The system of claim 16, wherein the processing device is configured to designate two innermost blocks relative to an edge of a plane in which the blocks are included as the interior blocks.

19. The system of claim 15, wherein the quantity of the plurality of blocks is equal to eight blocks per plane in the memory device, and wherein the processing device is configured to designate at least two of the eight blocks as the interior blocks.

20. The system of claim 15, wherein the plurality of blocks are physical blocks.

* * * * *